United States Patent
Grosseholz

(10) Patent No.: US 7,033,266 B2
(45) Date of Patent: Apr. 25, 2006

(54) DEVICE AND METHOD FOR CONTROLLING THE BEGINNING OF A TOOL OPERATION IN FISH TREATMENT MACHINE

(75) Inventor: Werner Grosseholz, Krummesse (DE)

(73) Assignee: Nordischer Maschinenbau Rud. Baader GmbH & Co KG, (DE)

( * ) Notice: Subject to any disclaimer, the term of this patent is extended or adjusted under 35 U.S.C. 154(b) by 39 days.

(21) Appl. No.: 10/398,368

(22) PCT Filed: Oct. 9, 2001

(86) PCT No.: PCT/EP01/11638

§ 371 (c)(1),
(2), (4) Date: Apr. 4, 2003

(87) PCT Pub. No.: WO02/30209

PCT Pub. Date: Apr. 18, 2002

(65) Prior Publication Data

US 2004/0014416 A1    Jan. 22, 2004

(30) Foreign Application Priority Data

Oct. 10, 2000   (DE) .............................. 100 50 9684

(51) Int. Cl.
*A25C 25/14*   (2006.01)

(52) U.S. Cl. ..................................... 452/180
(58) Field of Classification Search ........ 452/160–162, 452/120–123, 156, 157, 150
See application file for complete search history.

(56) References Cited

U.S. PATENT DOCUMENTS

| 4,037,294 | A | * | 7/1977 | Cowie et al. ................ 452/136 |
| 4,507,823 | A | * | 4/1985 | Wulff ........................ 452/121 |
| 4,507,824 | A | * | 4/1985 | Sawusch ..................... 452/121 |
| 4,574,430 | A | * | 3/1986 | Hartmann .................... 452/135 |
| 4,748,723 | A | * | 6/1988 | Braeger et al. ............. 452/122 |
| 4,811,460 | A | * | 3/1989 | Emanuelsen ................. 452/118 |
| 5,026,318 | A |   | 6/1991 | Jahnke |
| 5,061,221 | A | * | 10/1991 | Holzhuter et al. .......... 452/184 |
| 5,453,042 | A | * | 9/1995 | Novello ..................... 452/128 |

(Continued)

FOREIGN PATENT DOCUMENTS

DE    2832259    7/1978

(Continued)

OTHER PUBLICATIONS

Article by Mjasnikowsky.

*Primary Examiner*—Thomas Price
(74) *Attorney, Agent, or Firm*—Mattingly, Stanger, Malur & Brundidge, P.C.

(57) ABSTRACT

In a device and method for controlling the commencement of operation of at least one tool in a fish processing machine, a guide element penetrates the interior of the fish so as to perform alignment of the fish before the tool begins its application. A monitoring device associated with the guide element includes a sensor for determining the guide element/fish position. An evaluating unit connected to the sensor compares nominal and actual position values. On reaching an adjustable nominal position value, a signal for actuating the tool is triggered. Therefore, the tool comes into operation only when the monitoring device yields an actual value for the fish position which corresponds to the nominal value when the guide element has penetrated properly.

6 Claims, 2 Drawing Sheets

U.S. PATENT DOCUMENTS

| | | | |
|---|---|---|---|
| 5,536,205 A * | 7/1996 | Braeger et al. | 452/161 |
| 5,735,735 A * | 4/1998 | Hahn et al. | 452/119 |
| 5,871,395 A * | 2/1999 | Grabau et al. | 452/162 |
| 5,980,376 A * | 11/1999 | Grosseholz et al. | 452/116 |
| 6,280,313 B1 * | 8/2001 | Braeger et al. | 452/161 |
| 6,322,437 B1 * | 11/2001 | Grabau et al. | 452/161 |

FOREIGN PATENT DOCUMENTS

| | | |
|---|---|---|
| DE | 19829376 | 7/1998 |
| RU | 2003104986/13 | 6/2003 |
| SU | 125656 | 3/1959 |
| SU | 381193 | 7/1970 |
| SU | 586822 | 12/1977 |

* cited by examiner

DEVICE AND METHOD FOR CONTROLLING THE BEGINNING OF A TOOL OPERATION IN FISH TREATMENT MACHINE

BACKGROUND OF THE INVENTION

1. Field of the Invention

The invention concerns a device and a method for controlling the commencement of operation of at least one tool in a fish processing machine in which tool and fish are moved relative to each other along a given conveying path, wherein the position of the fish in relation to the tool is determined by means of a guide element which penetrates into the interior of the fish, and after alignment of the fish as a result of penetration of this guide element the tool begins its application to or intervention in the fish.

2. Description of Related Art

In the processing or treatment of fish it is necessary in many cases, particularly when the fish is not yet gutted, that is, the abdominal cavity is not yet cleaned, to align it in the region thereof in order to open it by means of a slitting blade and then extract the entrails by means of a suction device and/or carry out cleaning in this region by means of scrapers, brushes or the like. In a traditional procedure such as is described e.g. in DE 198 29 376 A1, the fish is transported lying on its back in V-blocks of a chain conveyor, but machines in which it is guided and transported from the outside by means of conveyor belts are known too. In order to align it in relation to its central axis, a guide element is introduced into the abdominal cavity or digestive tract, which in the case of the prior-art device described is effected by means of a spike which penetrates into the anus.

With the known procedures, due to the fact that the fish is guided only relatively loosely in the holding V-blocks of the chain conveyor or between conveyor belts and for example fish deformation cannot be compensated, difficulties arise if the anus or other region of penetration is missed by such a spike. As a result of this, the spike pushes the fish sideways and then the point of the spike damages the scales covering the fish in the flank region. However, in particular subsequent tools such as suction devices, scrapers and above all even the slitting knife which here operates in a functional unit with the spike but can also be used separately, which tools are shown e.g. in DE 198 29 376 A1, destroy the fish at unwanted locations, thus especially the top side of the fish, so that the end product no longer meets the demanded premium quality requirements. This is a drawback particularly if, as described there, the aim is to make the so-called "princess cut", which up to now could be made manually only, by machine (to which cut a gutting method refers which ensures a work result which meets the highest quality requirements and leaves the last 2 to 3 cm of the ventral wall in the gill region closed), and if it is wished above all to make noble or high-value fish accessible to machine processing as well.

SUMMARY OF THE INVENTION

It is therefore the aim of the invention to provide a remedy with respect to such difficulties and drawbacks and above all to avoid the above-mentioned damage.

In particular, it is the object of the invention to ensure that the subsequent tools become operative only in case of functionally proper penetration of the spike and hence correct positioning of the fish.

This object is achieved in the device set forth above according to the invention by the fact that associated with the guide element is a monitoring device which includes a sensor for the guide element/fish position, an evaluating unit for the comparison of nominal (set) and actual (measured) values, which is connected to the sensor, and an actuating device for the tool, which is connected to this evaluating unit. With the method of the kind described hereinbefore, according to the invention the position of the fish relative to the guide element is monitored, and only on reaching an adjustable nominal position value is a signal for actuating the tool triggered. In other words, according to the invention both the slitting knife and other, subsequent tools which are movable relative to the fish come into operation only when monitoring with the monitoring device yields an actual value for the fish position which corresponds to the nominal value of the fish when the spike has penetrated properly.

According to a preferred embodiment of the invention, the sensor may be a transmitter/receiver device in particular for electromagnetic waves, wherein monitoring of the fish/guide element position is advantageously effected optically. In this case a light source can be selected as the sensor, while the receiver can appropriately be arranged in the guide element itself and connected to the evaluating unit by optical fibres. In this case, advantageously, modulated light is used to exclude disturbing influences of extraneous light (daylight, lamps, etc.) as far as possible. In this embodiment, the receiver registers the modulated light emanating from the transmitter located outside the fish and preferably above it. If the point of the spike is located in the fish, then the receiver does not register a light signal, and the evaluating unit ascertains matching between actual and nominal values in order to initiate the actuating signal, whereupon the subsequent tools can penetrate into the abdominal cavity and work in or on the fish. If on the other hand the spike point misses the point of penetration, that is, the anus, and if it moves outside the abdominal cavity, then the light emitted by the transmitter is registered by the receiver at the spike point. This circumstance triggers a non-matching signal in the evaluating unit, causing the subsequent tools to remain in their rest position. The fish whose flank remains undamaged can be removed at the end of the conveying path of the transport device and introduced into the system anew.

In another advantageous embodiment of the invention, the sensor may be a mechanical feeler for the position of the fish relative to the guide element. In this case, with respect to the method, monitoring of the fish/guide element position is effected mechanically, this being by training the fish body and monitoring the tracing position relative to a nominal value for triggering the signal. Such a feeler is advantageously monitored with a proximity switch.

Appropriately, the feeler may be designed as a double sensing lever with one lever element movable separately from the other on either side of the guide element. With respect to the method, tracing is carried out as double tracing at two tracing points, and the nominal value for triggering the signal is determined by comparing tracing points. In a structural respect, in this case on either side of the point of the guide element is arranged a sensing lever, and the two sensing levers are mounted on a common rotary shaft, their position being monitored or checked by means of the above-mentioned proximity switch. If the spike, which is arranged centrally between the sensing levers, is located outside the fish, then the two sensing levers are in the normal position, and the proximity switch is damped. When the spike has penetrated into the fish, then the two sensing levers are deflected. Matching between actual and nominal values is registered. The consequence is the same as in the embodiment described above for optical control. If on the other hand the guide element slides over one side of the fish, then only the sensing lever between fish and spike is deflected, whereas the second sensing lever on the side facing away from the fish remains in the normal position. This results in registration of a deviation between actual and nominal values with the consequences already described for non-actuation of the tools.

BRIEF DESCRIPTION OF THE DRAWINGS

Further advantages and embodiments or options of the invention are apparent from the description below of the practical examples shown in the schematic drawings. They show.

DETAILED DESCRIPTION OF THE PREFERRED EMBODIMENT

Figure 1A:
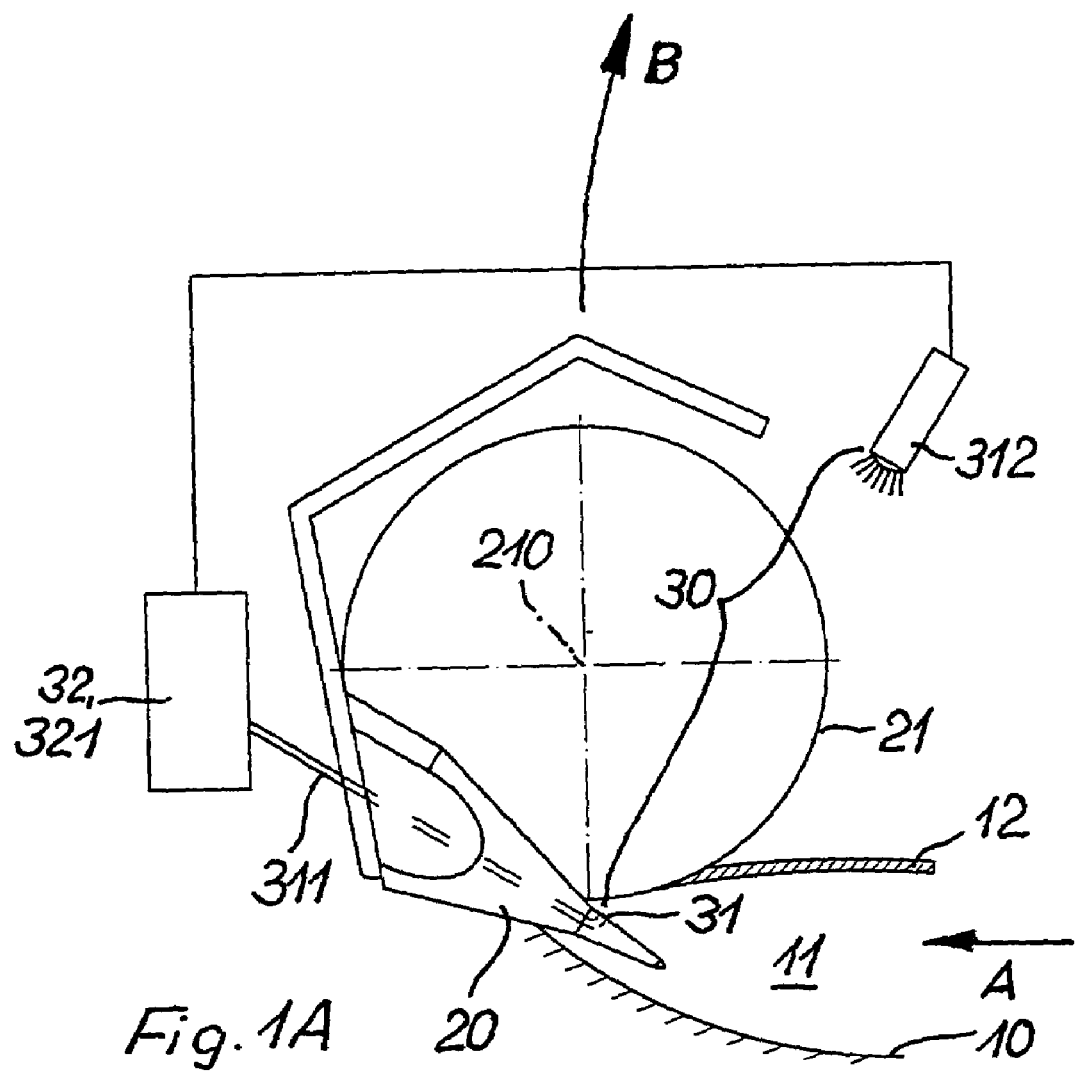
FIG. 1A a principle longitudinal-section representation of an optical monitoring device.

In FIGS. 1A and B can be seen a first embodiment of a spike assembly as used for example in a fish gutting machine of the kind shown in DE 198 29 376 A1. A fish 10 held with its ventral side facing upwards in a conveyor not shown in more detail here is conveyed tail first in the direction of arrow A. The abdominal cavity 11 and ventral wall 12 of the fish are here shown purely schematically. For the purpose of aligning the fish 10, a guide element designed as a spike 20 is arranged for penetration into the abdominal cavity through the anus opening, not described in more detail. This spike 20 comprises in the extent of its width a recess in which rotates a slitting blade 21 for slitting open the abdominal cavity. This slitting blade 21 slits open the fish, which is kept aligned by the spike 20, in its ventral wall 12 along the ventral seam as it advances in the direction of the arrow A, so that subsequently tools for extracting the entrails and cleaning the abdominal cavity can become operative.

Figure 1B:
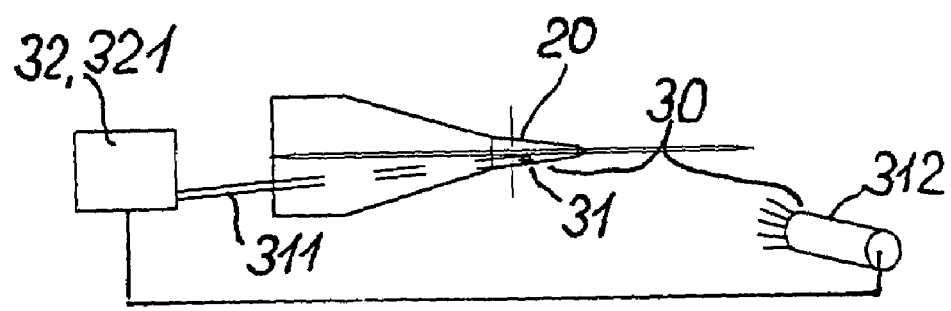
FIG. 1B a top view of the representation of FIG. 1A.

According to the present invention, as shown in FIGS. 1A and 1B, within the spike runs, with one end connected to a computer 32 or an evaluating unit 321, an optical fibre 311 of which the other end emerges on the upper side of the spike and ends flush with the latter. This end forms a sensor 31 of which the second functional element is located opposite and outside the fish and blade and is a light source 312 oriented towards this optical fibre end that together form a monitoring device 30. Light emitted from the light source 312 or other optical signals do not reach the end of the optical fibre 311 if the spike 20, as shown in the figure, has penetrated into the abdominal cavity properly and, due to its position in front of the slitting blade 21, is located in the region of the still closed ventral wall 12. The optical fibre 311 connected to the computer 32 on the other hand receives light if the spike 20 has not correctly penetrated into the anus, but is located outside the fish on the surface thereof. In this case the computer 32 or the evaluating unit 321 registers the light signals transmitted through the optical fibre 311. The function of the computer lies in converting these received light signals to control values by means of which there can be acted upon stepping motors as actuating members for tools, which are not shown in more detail here and are known from DE 19829 376 A1, for example. If, as in the first case described, the ventral wall is duly located between light source 312 and sensor 31, then no control signal is generated, and operation of the machine can take its normal course. If, on the other hand, when light impinges on the sensor 31 a control signal or signal sequence is triggered in the evaluating unit 321, then this is transmitted to the tools or their actuating members/stepping motors, and the tools remain in their starting position. This concerns in particular also the slitting blade 21 which then remains in its position in the recess of the spike 20 in the rest position without intervention in the fish. If, as in the known device, the spike and slitting blade are designed as a common structural component of the device and hence as a moving unit, then both move back in the direction of arrow B into the common rest position if the spike has not properly and functionally entered the anus. This common pivot movement is performed about an axis lying outside the representation, while the spike 20 alone can still pivot about the axis 210 of the blade 21 in order to be moved out of the fish at the end of cutting it. The movement in the direction of arrow B is performed once each per fish passing through.

Figure 2A:
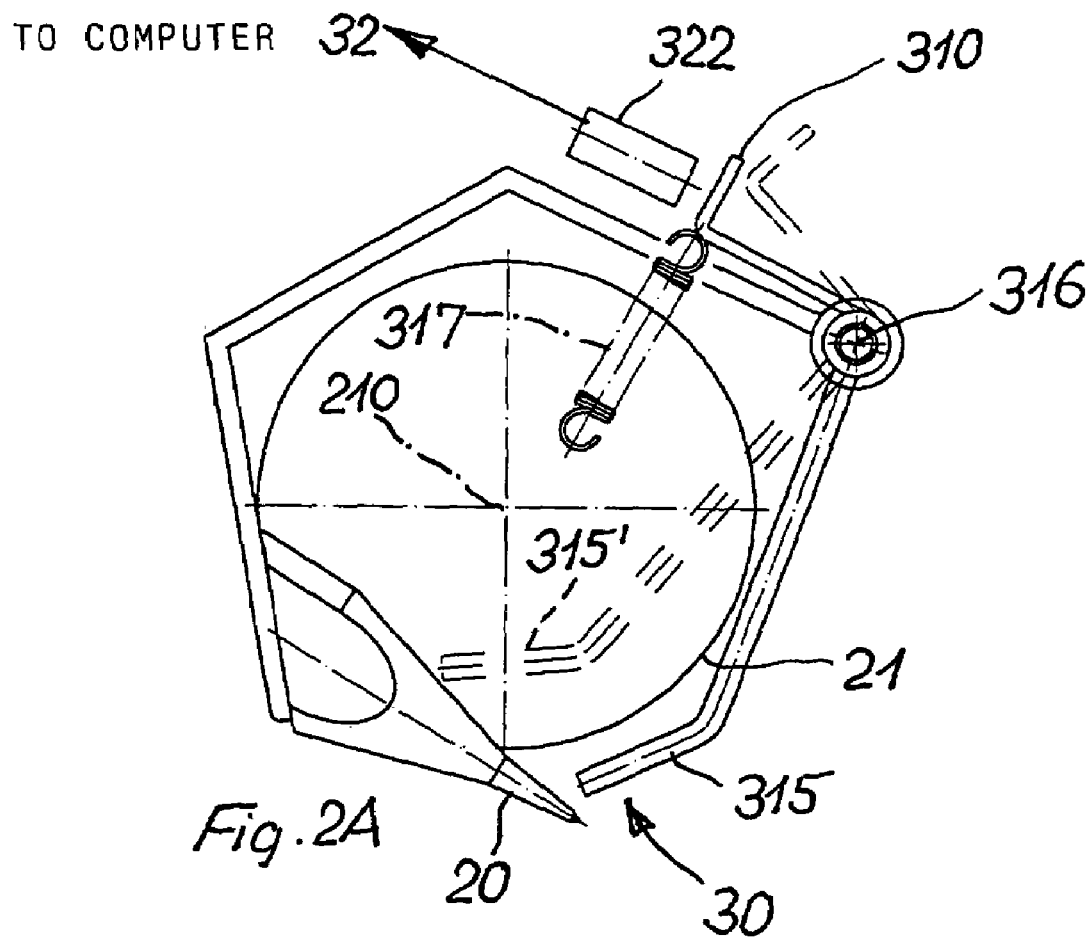
FIG. 2A a longitudinal section of a mechanical monitoring device, also as a principle representation, and FIG. 2B a top view of the representation of FIG. 2A.
Figure 2B:
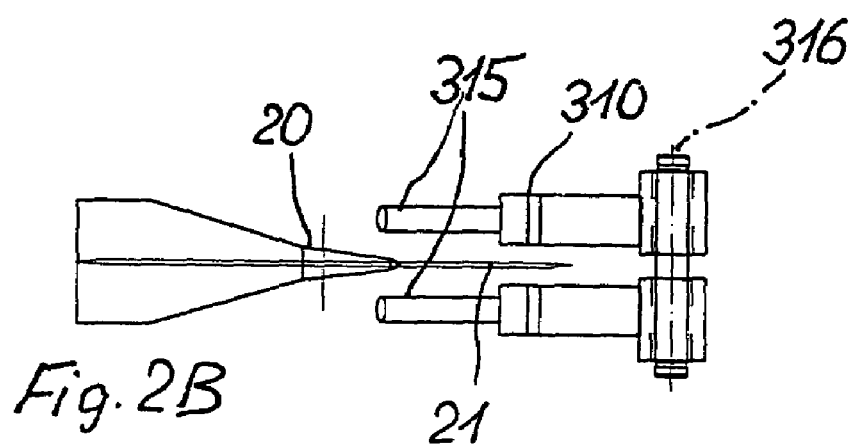

The further, namely mechanical embodiment shown in FIGS. 2A and B can likewise be used in a machine of the kind known from DE 198 29 276 A1. The spike 20, which is pivotable about the axis of rotation 210 of the slitting blade 21 into the fish, here co-operates with a sensor in the form of a pair of feelers 315 which is mounted on a pivot shaft 316 and pivotable about the latter. On each sensing lever is located a mechanical switching element 310 which cooperates with a proximity switch 322. This proximity switch 322 in turn is connected in switching relationship to the computer 32, not shown in more detail here.

In the position shown in unbroken lines, the spike 20 arranged centrally between the sensing levers 315 is located outside the fish, and the two sensing levers are in the normal position, so that the proximity switch is kept damped by the switching element 310. If the spike 20 now functionally enters the anus of the fish, then the two sensing levers are deflected into the position marked 315'. The proximity switch generates a signal via the computer, and the subsequent tools can be controlled so as to be able to clean the abdominal cavity after opening of the ventral wall by the slitting blade 21.

If on the other hand the spike 20 slides over one side of the fish, then only one of the two sensing levers, namely the one located on the fish side, this being between fish and spike, is deflected. On the other hand, on the side facing away from the fish the sensing lever 315 remains in the normal position under the action of a retaining spring 317. The proximity switch 322 consequently remains damped; no signal is generated.

Evidently, therefore, by means of the signals generated by the position of the sensing levers 315 in connection with the mechanical switching element 310 in the proximity switch 322, the subsequent tools can be controlled so as to enter the abdominal cavity only when the spike 20 is properly located in the fish and the slitting blade 21 opens the ventral wall.

All in all, therefore, conditions are created by means of the invention to ensure, in the machine processing of fish, and indeed noble or high-value fish too, that a product which meets the extremely high quality requirements of nowadays is produced.

The invention claimed is:

1. A device for controlling the commencement of operation of at least one tool in a fish processing machine in which tool and fish are moved relative to each other along a given conveying path, wherein a position of a fish in relation to the tool is determined by means of a guide element which penetrates into an interior of a fish, and after alignment of a fish as a result of penetration of the guide element, the tool begins engagement with a fish, wherein associated with the guide element is a monitoring device which includes a sensor for the guide element for sensing a position of a fish relative to the guide element, a computer for comparison of nominal and actual values, which is connected to the sensor, and an actuator for the tool which is connected to the computer.

2. The device according to claim 1, wherein the sensor includes a transmitter/receiver device.

3. The device according to claim 2, wherein the transmitter is a light source and the receiver forms the end of an optical fibre which is arranged in the guide element and connected to the computer in the form of an evaluating unit.

4. The device according to claim 1, wherein the sensor is a mechanical feeler for sensing the position of a fish relative to the guide element.

5. The device according to claim 4, wherein the feeler is a double sensing lever with one lever element movable separately from the other on either side of the guide element.

6. The device according to claim 1, wherein the guide element is a spike which penetrates into the fish.

* * * * *

UNITED STATES PATENT AND TRADEMARK OFFICE
CERTIFICATE OF CORRECTION

PATENT NO. : 7,033,266 B2
APPLICATION NO. : 10/398368
DATED : April 25, 2006
INVENTOR(S) : Grosseholz It is certified that error appears in the above-identified patent and that said Letters Patent is hereby corrected as shown below:

On title page item (30)

Please change the German Priority Document number from the incorrect number of "100 50 9684" to the correct number of --100 50 968.1-09--.

Signed and Sealed this

First Day of August, 2006

JON W. DUDAS
*Director of the United States Patent and Trademark Office*